July 23, 1929.  W. F. LITTLE  1,722,101

MEASURING DEVICE

Filed Aug. 20, 1924

William F. Little
INVENTOR.

Dyer Traylor
ATTORNEYS.

Patented July 23, 1929.

1,722,101

UNITED STATES PATENT OFFICE.

WILLIAM F. LITTLE, OF YONKERS, NEW YORK.

MEASURING DEVICE.

Application filed August 20, 1924. Serial No. 733,106.

The invention relates to a device for measuring, by weight or bulk, materials of either liquid or solid form.

The object of the invention is to provide means whereby mixtures of different bulk or weight may be made and in which the proportions of the different ingredients will remain the same.

This and further objects will more fully appear in the following specification and accompanying drawings considered together or separately.

One embodiment of the invention is illustrated in the accompanying drawings in which like parts in all of the views are designated by similar characters of reference, and in which Fig. 1 is a perspective view of a device for measuring articles in bulk.

Figure 1:
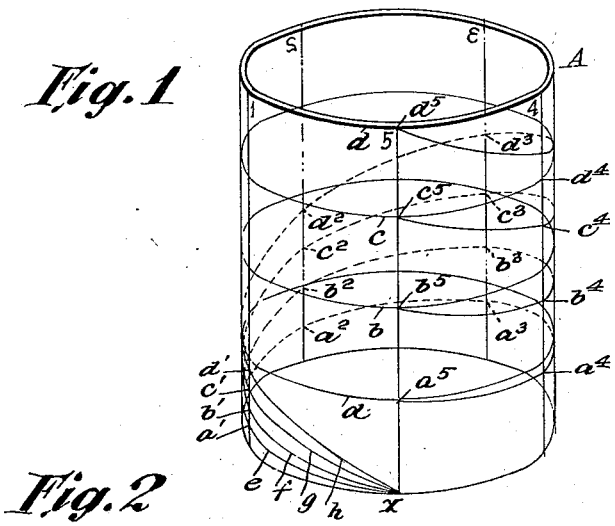

In the preferred form of device, shown in Fig. 1, A indicates a transparent, cylindrical measuring cup for measuring a mixture having four ingredients and capable of measuring each of them for any number of "portions" from one to five, each in the proper proportion.

The cup is provided with any desired number of spaced parallel horizontal lines, four being shown, as $a$, $b$, $c$, and $d$, which represents the ingredients and the proportions of the latter will be determined by the relative spacings of the lines. Thus in the drawings the horizontal lines $a$, $b$, $c$, and $d$, have been shown as spaced equally, indicating that the ingredients are to be of relatively equal volume or bulk.

The cup is also provided with a number of spaced parallel vertical lines, five being shown, as 1, 2, 3, 4 and 5, representing the number of allotments of different total volumes for which the cup may be satisfactorily employed. Thus, where a mixture of volume equal to that of the full container is desired, the line 5 with its sub-divisions or graduations is employed and when only four-fifths of the full cup volume is desired the line 4 will be used.

The intersections of the horizontal lines $a$, $b$, $c$, and $d$, with one of the vertical lines as 5, serve to graduate the latter in accordance with the proportions as represented by the spacings of the horizontal lines.

Figure 2:
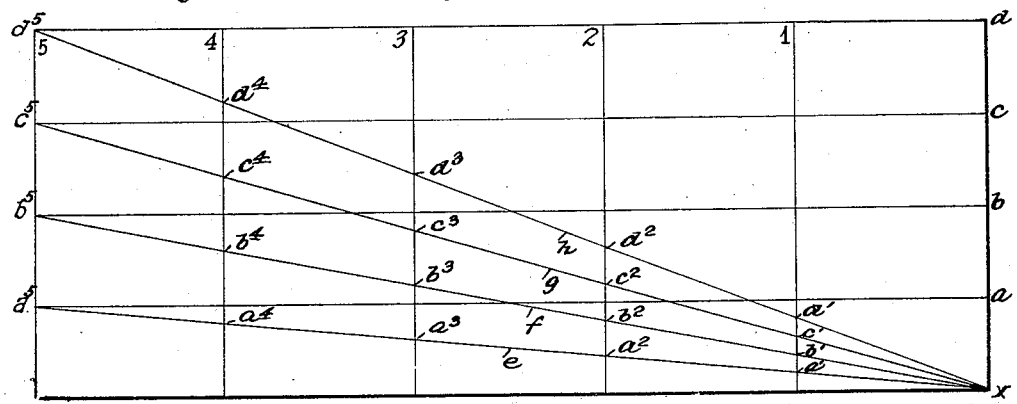
Fig. 2 is a diagram showing the cylindrical wall of the device developed.

As graphically illustrated in Fig. 2, four straight lines, $e$, $f$, $g$ and $h$ are etched, or otherwise formed, on the side of the cup and these lines extend from the point $x$ at the bottom of line 5 around the cup to the intersections of the line 5 with the lines $a$, $b$, $c$ and $d$ respectively.

It will be understood that the number of horizontal lines representing the number of ingredients used in the mixture for a maximum volume of mixture may vary, as may also the vertical lines representing different volumes of mixture or the number of allotments to be poured from the cup whereby mixtures having more or less than four ingredients may be compounded into more or less than five allotments each having the same proportions of the ingredients.

Figure 3:
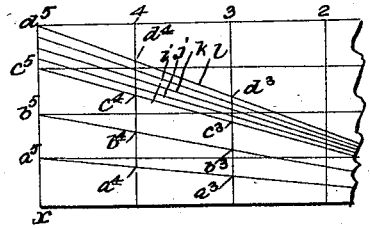
Fig. 3 is a diagram similar to Fig. 2 showing a modification.

Any desired number and spacing of graduations may be provided on the vertical line 5 and in Fig. 3, I have shown one section of the line 5 as that between the marks $c$ and $d$, as sub-divided further. In this way smaller amounts of any of the ingredients may be accurately measured.

It is desired to have it understood that the cup A may be of any desired shape other than cylindrical. It may be of any desired form or cross section.

In compounding a drink composed of four ingredients of equal volume for five persons, the cup will be filled each ingredient filling a space between two horizontal lines $x$—$a$, $a$—$b$, $b$—$c$, and $c$—$d$. In making the same drink for one person the ingredients will be measured on the line 1 at the points $a'$, $b'$, $c'$ and $d'$. For two persons on the line 2 and for three persons on the line 3.

It will be understood that the lines $a^5$—$x$ etc. need not extend entirely around the cup A, as shown, but may be indicated on the vertical lines at the crossing points only.

It will also be understood that the cup need not be of transparent material but may be opaque with transparent portions at the points where the horizontal and diagonal lines cross the vertical lines.

Instead of employing a measuring cup such as is shown in Fig. 1, the invention may be carried out in any vessel, by placing the requisite markings on, for example, a thin sheet of suitable material, of such dimensions that it may be placed within the receptacle.

In compounding a mixture such as that described in connection with the cup of Fig. 1 a card-like sheet marked like the diagram of Fig. 2, but with the vertical lines 1, 2, 3, 4 and 5 closer together, may be employed in connection with any vessel in which the card can be inserted. The card may be placed in the vessel, and the proportions noted as before.

A plurality of sets of cards may be kept on hand, one set for pint cups, another for gallon measures, etc., and each set may have any number of horizontal and vertical lines cut by the diagonal lines whereby any desired quantity with any number of ingredients, and for any number of allotments may be measured and with the use of a very limited number of containers.

By this invention there is produced a graduated container which is particularly adapted for use in compounding a recipe or mixture of various ingredients for a total volume other than that in which the volumes of the individual ingredients is known. Thus where it is desired to compound a recipe for a number of persons other than that for which the recipe was originally formulated, the device herein disclosed is particularly adaptable.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed as new and desired to be secured by Letters Patent, is as follows:—

1. Means for compounding ingredients and measuring the mixtures of these, comprising a container adapted to hold said mixtures, there being a set of horizontal lines on the side walls of the container, each representing an ingredient portion of a mixture of maximum volume, a set of vertical lines on the side walls of the container, and a set of oblique lines on the side walls of the container, crossing the vertical lines, joining at a single point located substantially on the bottom periphery of the container and connecting said single point with the intersecting points of the horizontal lines with one of the vertical lines, so that the ingredient portions of mixtures of different volumes, as indicated on the vertical lines at their points of intersection with the oblique lines, are proportional to the ingredient portions of a mixture of maximum volume, as represented by the horizontal lines.

2. In a device for compounding ingredients and measuring the mixtures of these, a vessel adapted to hold the mixtures, having a scale formed thereon comprising a set of spaced vertical lines each of which is characterized by a numeral indicating the number of allotments to be poured from the vessel, the line indicating the maximum number of allotments having divisions marked thereon in accordance with the number of ingredients and their portions corresponding to a mixture of required volume for said maximum number of allotments, and a set of oblique lines intersecting said line at the divisions marked thereon and crossing the remaining vertical lines so that the ingredient portions of mixtures of different allotments as indicated on the vertical lines at their points of intersection with the oblique lines are proportional to the ingredient portions of the mixture of maximum number of allotments.

3. A compounding and measuring device comprising a container adapted to hold a mixture of ingredients, said container having formed thereon a plurality of sets of vertically spaced indicating marks, the marks of each set being differently spaced from the bottom of the container and in such a way that the distances between marks along any set are proportional to the distances between marks along any other set so that said marks indicate proportional amounts of the ingredients for mixtures of the different volumes.

4. A compounding and measuring device comprising a container adapted to hold a mixture of ingredients, said container having formed thereon a plurality of sets of vertically spaced indicating marks, each set being characterized by a numeral indicating the number of allotments to be poured from the container, and the marks of each set being differently spaced from the bottom of the container in such a way that the spacing between marks is uniformly increased from one set to another so that said marks indicate proportional amounts of the ingredients for different numbers of equal allotments to be poured from the container.

This specification signed and witnessed this thirteenth day of August, 1924.

WILLIAM F. LITTLE.